United States Patent [19]

Miyabe

[11] 4,086,317

[45] Apr. 25, 1978

[54] PROCESS FOR PRODUCTION OF A SYNTHETIC PAPER IMPROVED AGAINST DUSTING TROUBLE

[75] Inventor: Yoshio Miyabe, Ibaraki, Japan

[73] Assignee: Oji Yuka Goseishi Kabushiki Kaisha, Tokyo, Japan

[21] Appl. No.: 646,939

[22] Filed: Jan. 6, 1976

Related U.S. Application Data

[63] Continuation of Ser. No. 459,202, Apr. 8, 1974, abandoned.

[51] Int. Cl.$^2$ .................... B32B 31/12; B29D 7/24
[52] U.S. Cl. ................................ 264/134; 156/229; 156/244.24; 264/171; 264/288; 264/289; 427/173
[58] Field of Search ............... 264/171, 134, 288, 289, 264/DIG. 73; 427/171, 172, 173; 156/229, 242, 244

[56] References Cited

U.S. PATENT DOCUMENTS

| | | | |
|---|---|---|---|
| 3,290,166 | 12/1966 | Sharp | 428/195 |
| 3,711,323 | 1/1973 | Heap et al. | 260/29.6 H |
| 3,751,281 | 8/1973 | Peterson et al. | 427/172 |
| 3,775,521 | 11/1973 | Yamamoto et al. | 264/289 |
| 3,799,828 | 3/1974 | Takashi et al. | 156/229 |
| 3,819,773 | 6/1974 | Pears | 260/112.5 |

FOREIGN PATENT DOCUMENTS 1,124,063  8/1966  United Kingdom ............. 264/289

*Primary Examiner*—James B. Lowe
*Attorney, Agent, or Firm*—Wenderoth, Lind & Ponack

[57] ABSTRACT

In a process for production of a synthetic paper comprising a paper-like layer which comprises stretching in at least one direction a sheet comprising a layer of film of a resin loaded with a fine filler so as to whiten said film thereby to obtain a synthetic paper comprising the whitened film as the paper-like layer, the improvement for production of such a synthetic paper improved in dusting trouble, which improvement comprises coating said film to form said paper-like layer upon stretching with an aqueous binder material which can be dry-extensible, drying the binder material, and effecting the step of said stretching.

10 Claims, No Drawings

PROCESS FOR PRODUCTION OF A SYNTHETIC PAPER IMPROVED AGAINST DUSTING TROUBLE

This is a continuation of application Ser. No. 459,202, filed Apr. 8, 1974, now abandoned.

BACKGROUND OF THE INVENTION

The present invention relates to a process for production of a synthetic paper substantially free of dusting trouble. In particular, it is concerned with a process for production of a synthetic paper having improved continuous printability, especially continuous offset printability.

Instead of cellulosic paper consisting of entangled cellulose fibers, various synthetic papers produced by paper-making synthetic resin films have been proposed. Among such synthetic papers there is one type of a synthetic paper comprising a paperlike layer consisting of a stretched film of resins with fillers incorporated therein. The synthetic paper of this type may be composed of either a single layer structure composed of only such a paperlike layer or a laminate structure composed on a substrate layer with the paperlike layer coated on at least one of the surfaces thereof (see, Japanese Pat. Publication No. 40794/71, of which U.S. Pat. Nos. 3,799,828 and 3,841,943 are the U.S. counterparts; and Japanese Pat. Publication No. 1782/74 of which U.S. Pat. No. 3,765,999 is the U.S. counterpart.

Good papery properties of such a synthetic paper comprising a paperlike layer consisting of a stretched film of resins with fillers incorporated therein can be contributed to the presence of microvoids developed around the filler particles throughout the film. The microvoids are uniformly distributed throughout the depth of the paperlike layer, and those present on or near the surface of the paperlike layer are open to the outside of the surfaces of the layer. The communication of the surface microvoids with the outside and the presence of exposed filler particles on the surface are due to the stretching of a film of a resin with the filler incorporated therein. These characteristics make it possible for this type of the synthetic paper to possess good quality of paper, printability or ink-receiving capacity and ink-drying property.

Problems awaiting solution

However, this feature of the surface microvoids presents a problem. That is, the filler particles exposed on the surface of the paperlike layer may come off from the surface, which results in an adverse effect on printing working.

This problem may be actualized in a continuous printing. In particular, in offset printing when ink is transferred on the paper from a blanket roll the unstable or exposed filler particles on the surface thereof come off due to the high pressure applied thereon and adhere to the blanket roll (weak surface layer will also incidentally come off), which reduces printing workability which in turn leads to an increase in cost and damage to the printing uniformity of the print produced. While being not so remarkable as in offset printing, this problem also arises in both relief printing and intaglio printing.

Troubles due to the occurrence of the fallen fines or "paper dust" from such a synthetic paper, or dusting trouble, are more or less observed during printing and, with regard to cellulosic paper, paper manufacturers and printers have made various studies to overcome the troubles.

Because of the advantage of the synthetic paper comprising a paperlike layer consisting of a stretched film of a resin with filler particles incorporated therein a solution to preventing dusting trouble is also desired in this case. Suitable means intended for cellulosic papers, however, are not necessarily applicable to the above-mentioned synthetic paper. For instance, as for a means comprising applying a polymeric coating material, when the polymer used is a styrene/maleic acid copolymer the "paper dust" is strongly fixed on the paper, while the drying property of ink is remarkably deteriorated; when polyvinyl alcohol is used as the polymer in place of the styrene/maleic copolymer fixation of the paper dust is poor and ink transference is deteriorated; when polyethylene imine is used as the polymer, fixation of the paper dust is appreciably satisfactory, while film properties (such as texture as a paper, stickiness) are poor; and when natural products such as starch are used both fixation of the paper dust and adhesion thereof to the surface of the paper are poor.

Generally, when a polymeric coating material is applied on the synthetic paper comprising a paperlike layer consisting of a stretched film of resin with filler particles incorporated therein, the resulting adhesion is frequently poor in itself because of the stretched condition of the paperlike layer and dependence of the type of the resin, and so particularly when the resin is an olefin polymer. Thus, in order to prevent the occurrence of trouble due to the poor adhesion of the dope material in the secondary processing of the coated paper, particular polymeric coating materials should be selected.

This problem can be dissolved by coating an aqueous solution of acrylamide compound polymers (see, Japanese Pat. Publication No. 96664/73). Thus, these polymers are substantially free of the above-mentioned disadvantages, and since they are further used in the form of an aqueous solution there is no danger of change in quality of the usually hydrophobic synthetic paper (for example, curl, shrinkage), toxicity, fire and the like in the synthetic paper to be treated as is often the case with organic solvents.

However, as this prior method includes the use of a water-soluble polymer as a polymeric coating material the resulting paper is poor in water-proofness, and the print produced is limited in its use and is unsatisfactory for practical use.

The problem of reduction in water-proofness due to the coating material may be overcome by using an aqueous emulsion of a water-insoluble polymer. However, in this case a surface active agent used for emulsification provides detrimental effects such as bleeding and reduction in ink transference.

As a means for overcoming the problem of water-proofness while maintaining the advantage of a aqueous system the use of phenolformaldehyde condensation products and aminoplast condensation products may be proposed. However, these materials have the disadvantage that they must be cured by heating. Since the synthetic paper to be treated is composed of stretched films, heating temperatures should be limited within a certain range from the standpoints of dimensional stability of the films so as to prevent shrinkage or curling of the synthetic paper. This is the same with other thermosetting resins such as epoxy resins.

Although a layer of the polymeric coating material must be very thin (for example the coverage is in the range of from 0.1g to 1g/m² on the basis of the coating material), it is not always easy to provide a thin and uniform coating of an aqueous solution of a paste polymer on a paperlike layer. That is, the formation of a uniform and thin layer is essentially difficult and, further, because of the hydrophobic nature of the paperlike layer resin such as an olefin polymer an aqueous solution of a polymeric coating material is repelled and it is difficult to form a uniform and thin layer.

SUMMARY OF THE INVENTION

It is an object of the present invention to remove the above-mentioned disadvantages and to present a synthetic paper which consists of a stretched film of a resin with filler particles incorporated therein and which is improved against the dusting trouble.

These objects can be accomplished according to the present invention by coating an aqueous dispersion such as a solution or an emulsion of a dry-extensible polymeric coating material on the film of a resin with filler particles incorporated therein, drying the solution on the film and thereafter stretching the coated film whereby the film of a resin produces the paperlike layer with a thin layer of the coating material adhered thereto.

In this way, notwithstanding that the present invention enjoys the advantage of using a polymeric coating material in the form of an aqueous solution or an aqueous emulsion, it has succeeded in eliminating the above-mentioned problems encountered in the prior arts, i.e. poor water-proofness and bad adhesion to the paperlike layer.

The present invention enables the use of some polymeric coating materials such as a styrene-maleic acid copolymer which are heretofore excellent in fixation of the paper dust while unsatisfactory in other respects and some other polymeric coating material such as polyvinylalcohol which are heretofore poor in fixation of the paper dust.

In accordance with the present invention, the polymeric coating material is subjected to a stretching operation, whereby it is reduced in thickness and the original thickness of the polymeric coating material before stetching may thus be relatively thick. The formation of a relatively thick coating material layer and the control of its thickness may be easily carried out.

The synthetic paper subjected to the surface treatment according to the present invention greatly improved in continuous offset printability and has improved gloss, smoothness and surface strength and further provides improved ink trapping in continuous offset printing (four- or two-color machine) and weather resistance in offset printing. In addition, the synthetic paper treated according to the present invention is more excellent in ink trapping, adhesion between the coating material and the substrate paper, texture and smell then the synthetic paper coated with a polymeric coating material after stretching. It is considered that such advantageous properties can be attributed to the fact that stretching of the polymeric coating material together with the paperlike layer provides a great improvement in the adhesion between the polymeric coating material and the surface of the paperlike layer.

DETAILED DESCRIPTION OF THE INVENTION

1. Synthetic paper
Preparation process

A stretched film of a resin with filler particles incorporated therein is utilized as the paperlike layer in the synthetic paper of the present invention.

One class of such synthetic paper consists of synthetic paper of a single layer structure which is composed of uniaxially or biaxially stretched film of a resin with fine filler particles incorporated therein.

Another class thereof consists of synthetic paper of a laminate structure which is composed of such a stretched paperlike layer laminated onto at least one surface of a substrate layer. The typical synthetic pape of such a laminate structure is one in which the paperlike layer is uniaxially stretched and the substrate layer is biaxially stretched. This type of the synthetic paper can be prepared by extruding a resin with filler particles incorporated therein on at least one surface of substrate film of a resin which has been longitudinally stretched (at least 1.3 times), which substrate film can contain a small amount of filler particle, into a laminate and stretching the laminate in the transverse (by at least 2.5 times). (see, Japanese Pat. Publication No. 40794/71 and British Pat. No. 1,268,823.

The coating of an aqueous dispersion of the polymeric coating material in accordance with the present invention is carried out at the latest before the last stretching to which the film of a resin with filler particles incorporated therein composing the paperlike layer is subjected in practicing the preparation process as stated above (hereinafter described in detail). The stretching procedure per se after the coating of an aqueous dispersion of the polymeric coating material and the drying of the coating is substantially similar to the afore-mentioned stretching.

Materials for the synthetic paper

In all cases, as a synthetic resin suitable for the film, a variety of stretchable thermoplastic resins, in particular those which are capable of being molecularly oriented by stretching, may be used by themselves or in combination. Examples of such resins include, for example, α-olefin polymer resins such as homopolymers consisting essentially of ethylene (ethylene is hereindefined as an α-olefin), propylene or butene-1, copolymers consisting essentially of these α-olefin such as resinous copolymer consisting essentially of ethylene and propylene, polyamide resins, polyester resins such as polyethylene terepthalate, polyvinyl or vinyldene resins such as homopolymers or copolymers of vinyl chloride or vinyldene chloride, homopolymers or copolymers of styrene. For the laminate structure, each layer may be composed of the same or different resins. The fillers usually are inorganic materials in a powder form. Examples of such inorganic materials include, for example, clay, talc, asbestos, gypsum, barium sulfate, calcium carbonate, titanium oxide, zinc oxide, magnesium oxide, diatomaceous earth silicon oxide, and the like. Of course, these are in the form of powder, and the particle size of the powder usually is in the range of from 0.5 to 30 micron. The amount of the powder to be incorporated has only to be sufficient to develop papery properties upon stretching of the film to which the powder has been loaded. For the paperlike layer of the afore-mentioned laminate structure the amount usually is in the range of from 0.5 to 65% by weight and particularly from 5 to 60% by weight.

2. Polymeric coating material

Polymer

Polymers for the coating material are selected from various standpoints.

In the first place, the polymeric coating material should be extensible when it is dry because it is stretched together with the resin on which it is coated in preparing the paperlike layer. In addition thereto, other considerations are that the material should be mechanically and chemically stable from the standpoint of moldability thereof, that it should be satisfactory in fixation of the paper dust, ink dryness, ink adhesion, ink trapping (for example, being less sensitive to water in offset printing), stickiness, adhesion, gloss, color tone, toxicity and the like from the standpoint of quality as a coating material on the paperlike layer, and that it should be homogeneously blendable with the resin material of the synthetic paper and at the same time heat-resistant per se since the trimming loss cut off edges or inferior products may be possibly melted and shaped into film for re-use in the process of synthetic paper preparation.

Further, since the polymeric coating material is used as an aqueous dispersion, that is, as an aqueous solution or an aqueous emulsion, in the case where the material is used as an aqueous solution it should be soluble in an aqueous solvent to such an extent that it may provide a coating dope with the required concentration, for example, of from 5 to 30% by weight of the solution.

Examples of the water-soluble polymer which may be used as the polymeric coating material include:

water-soluble homopolymers or copolymers (including, for example, partially hydrolyzed homopolymer) of acrylamide or each of the α-and/or N-substituded derivatives thereof such as, for example, methacrylamide, N-methlolacrylamide and the like; homopolymers or copolymers of alkyl acrylate or metacrylate, such as, for example, partially hydrolyzed product of polyalkylacrylate (in particular lower alkyl, e.g. $C_1$–$C_4$, acrylate); homopolymers or copolymers of acrylic acid and methacrylic acid or the salts thereof, such as, for example, alkalimetal salts, ammonium salts and amine salts; homopolymers or copolymers of maleic acid or the salts thereof such as, for example, styrene-maliec acid copolymers; and partially hydrolyzed products of homopolymers or copolymers of vinyl esters such as vinyl acetate. Examples of water-insoluble polymers include those consisting of the above-mentioned monomeric species, such as, for example, homopolymers or copolymers of an alkyl acrylate in particular a lower alkyl acrylate, ethylene-vinylacetate copolymers and the like.

The especially preferred polymeric coating materials include $C_1$–$C_8$, preferably $C_2$–$C_6$ alkyl acrylates, ethylenevinyl acetate copolymers, polyethylene wax and the like, all in an aqueous dispersion.

Coating dope

The coating dope is an aqueous dispersion, namely an aqueous solution or aqueous emulsion of the polymer as stated above.

As an aqueous solvent or an emulsifying medium, in addition to water by itself, a mixture of water and a water-soluble organic solvent such as, for example, an alcohol, e.g. methanol, and a ketone, e.g. acetone may also be used.

In addition to the polymeric coating material as an essential component and emulsifying agents which are preferably used in the case of an aqueous emulsion, the aqueous solution may contain another water-soluble or emulsifiable polymer, an acid, a base, a salt, a filler, a dye and pigment, a brightener, an antistatic agent, a ultraviolet ray absorbing agent, an ink drying agent, an ink transferring agent, an oil agent and the like.

The concentration of the aqueous solution can be determined from the standpoint of the preparation of the solution and coating workability. The concentration of the polymeric coating material is usually in the range of from 3 to 10% by weight, and preferably from 4 to 7% by weight of the dispersion.

3. Coating of the polymeric coating material on the synthetic paper

Object to be coated and timing of coating

As previously stated, the coating of the aqueous solution of the polymeric coating material in accordance with the present invention is carried out, at the latest, before th last stretching step to which the film of resin with filler particles incorporated therein composing the paperlike layer is subjected in practicing the process of producing the synthetic paper as mentioned above. For instance, in the case where the film in the form of a single layer is uniaxially stretched the coating is carried out before stretching, and in the case where the film in the form of a single layer is biaxially stretched the coating is carried out before the latter stretching (in usual, the tranverse stretching) and/or before the former stretching (in usual, the longitudinal stretching). The same is true with the case where the film in the form of a laminate structure is concerned. For example, in the case where the resin with filler particles incorporated therein is extruded onto at least one surface of the longitudinally-stretched film into a laminate and the laminate is stretched in the transverse direction, the coating is carried out before the transverse stretching.

The stretching procedure after coating and drying of the aqueous polymeric coating material is substantially similar to that in the case of no coating.

Pre-treatment

Since the polymeric coating material is stretched together with the precursor of the paperlike layer in accordance with the present invention, the adhesion developed between the polymeric coating material and the paperlike layer is satisfactory. However, in order to improve the wettability and adhesion of the paperlike layer to the aqueous solution which is one preferred example of the aqueous dispersion of the polymeric coating material or to remove the filler particles separated on or just before being separated from the surface of the paperlike layer to be coated it is generally preferable to subject the surface of the paperlike layer to appropriate pre-treatment.

As suitable pre-treatment methods there may be mentioned an electrical method such as a corona discharge treatment, a chemical method such as a flame treatment, a mechanical method such as a vacuum treatment and the like.

Coating

The coating of the aqueous dispersion of the polymeric coating material may be conducted by any means which is resorted to in the art. For instance, there may be mentioned a means of contact type such as by an air knife, a sizing press, a roll coater and the like; and a means of non-contact type such as by mist method, an electrostatic coating and the like. The aqueous dispersion should be applied as uniformly as possible.

The amount of the dispersion or dope applied may optionally vary within the range in which the desired effects can be achieved. In general, the amount is in the order of from 1 to 8g/m² (before stretching) or 0.1 to 3g/m², and preferably from 0.3 to 1g/m² (after stretching) on the basis of the polymeric coating material. With the amount below the lower limit the fixation of the paper dust is unsatisfactory, while the amount above the upper limit there is a tendency for the excellent papery properties of the stretched film paperlike-layer of the resin with filler particles incorporated therein to deteriorate, which leads to the degradation of ink dryness, ink transference, and back trapping ability.

In the process for producing the synthetic paper as stated above, the lateral edges of the produced paper after stretching are generally cut off to provide the final product. Therefore, there is no need to spread the polymeric coating material over the full width of the sheet before stretching. Particularly when the stretching is carried out by, for example, a tenter method, the coating is desirably carried out so as not to cover the portions to be held by a tenter clip.

After coating, the sheet is dried and stretched to give a synthetic paper possessing improved continuous printability, especially offset continuous printability.

Preferred embodiments

The advantages of the present invention will be concretely illustrated by the experimental examples as shown below. It is not intended to limit the present invention to the following specific embodiments.

EXAMPLE 1

Production of the improved synthetic paper:

8% of clay having a particle size of 2μ, 3% of diatomaceous earth having a particle size of 5μ and 89% of polypropylene are mixed with an antioxidant to prepare a composition, from which a sheet is produced and the sheet is stretched by five times (namely, the ratio of length after stretching/before stretching is 5) in the longitudinal direction. A composition consisting of 40% of clay having a particle size of 2μ and 60% of polypropylene is melt-extruded on the both surfaces of the longitudinally stretched sheet through an extruder to produce a laminate sheet. The resulting laminate sheet is subjected to a corona discharge treatment at 50 W/m²min. A mixture of an aqueous emulsion (10% solid content) of poly ethyl acrylate and an water-soluble amphoteric polymeric antistatic agent (1.5% solid content) is applied on the treated sheet at a coverage of 4g/m² of a solid content by means of a reverse roll coater, and the coated sheet is dried.

The coated laminate sheet is stretched by 7 times in the transverse direction, and is further subjected to a corona discharge treatment at 50 W/m.²min.

Evaluation:

The film thus produced was found to have the following properties and to be a synthetic paper excellent in continuous offset printability.

| | |
|---|---|
| Apparent density | 0.78g/cm² |
| Apparent porosity | 30 % |
| (surface layer 38%, substrate layer 22%) | |
| Whiteness | 92 % |
| Opacity | 95 % |
| Gloss | 25 % |
| Surface strength | great |

The paper product was subjected to a printing test by means of a Model Dia II offset continuous printing machine (manufactured by Mitsubishi Heavy Industry Co.). For comparison, a sheet which has been subjected to a corona discharge treatment at 50W/m²min after stretching without applying the polymeric coating material and then coated with a 1.5% aqueous solution of a water-soluble polymeric antistatic agent alone was tested in the similar manner.

After 3,000 sheets of the present paper has been printed, it was found that the ink tack and the ink remains on the blanket and the blanket whiteness were approximately similar to these before printing and the prints remained almost unchanged from the beginning to the end.

Evaluation of the comparative paper after 500 sheets had been printed revealed a great change in the ink remains on the blanket as well as a change in the printed surface, and a further printing was found to be difficult.

The evaluations as to other respects were as follows.

| | Paper of the present invention | Comparative paper |
|---|---|---|
| Fixation of paper dust | above 3000 sheets | below 500 sheets |
| Water sensitivity (ink transference at the second roller) | ⊙* | ○* |
| Ink dryness | 4 HR | 4 HR |
| Reverse side transfer | good | good |
| Surface resistivity | 4 × 10¹⁰Ω | 5 × 10¹⁰Ω |

* ⊙ = very good
○ = good

EXAMPLE 2

A synthetic paper was prepared wherein an aqueous solution containing 10% of poly (ammonium acrylate) having a molecular weight of 100,000 and 1.5% of an amphoteric polymeric antistatic agent according to the same procedure described in Example 1.

The synthetic paper thus obtained, and a comparative paper which was subjected to a corona discharge treatment at 50 W/m²min after the transverse stretching without pre-coating and then coated with said coating agent by means of sizing press and dried, were printed by the Model Diam II printing machine and the printed paper were compared with each other.

The results are shown in the following table.

| | Pre-coating system (The present method) | Comparative paper |
|---|---|---|
| Fixation of paper dust | above 3000 sheets | above 3000 sheets |
| Ink transference | ⊙* | Δ* |
| Ink drying time | 4HR | 4HR |
| Surface resistivity | 5 × 10¹⁰ | 5 × 10¹⁰ |
| Surface strength | ⊙* | ○* |
| Gloss % | 23 | 18 |
| Ink trapping | ⊙* | X* |
| Texture | ⊙* | Δ* |
| Coverage, g/m² | 0.4 | 0.4 |

*Note:
*⊙ = Very good
○ = Good
Δ = Slightly poor
X = Poor

EXAMPLE 3

Effect of coverage in g/m²:

The similar tests were carried out according to the same conditions as those described in Example 1 except that an aqueous emulsion of a ethyl acrylate-butyl acrylate copolymer as a coating agent is used in different coverages as indicated in the following table.

The results are shown below.

| Coverage g/m² | Fixation paper dust | Texture | ink drying HR | Gloss |
| --- | --- | --- | --- | --- |
| 0 | * | * | 4 | 14 |
| 0.1 | X* | * | 4 | 17 |
| 0.2 | Δ* | * | 4 | 20 |
| 0.5 | * | * | 4 | 25 |
| 0.75 | * | Δ* | 5 | 30 |
| 1 | * | Δ* | 6 | 35 |
| 1.5 | * | X* | 8 | 40 |
| 3 | * | X* | 12 | — |

*Note:
 = Good  Δ = slightly poor  X = poor

What is claimed is:

1. In a process for producing a synthetic paper having an opaque paperlike layer on at least one surface thereof which comprises stretching in one axial direction a laminate sheet containing a surface layer of a resin having fine filler particles incorporated therein laminated on to at least one surface of a resinous substrate, said stretching operation causing the resin surface containing the fine filler particles to become opaque, the improvement which comprises (a) coating the surface of the layer containing filler particles therein with an aqueous dispersion of a dry-extensible, polymeric coating material to avoid dusting problems due to the filler particles coming off the surface of the resin layer, said coating material being selected from the group consisting of $C_1$-$C_8$ alkyl acrylate homopolymers or copolymers, ethylene vinyl acetate copolymers and polyethylene wax, the concentration of said coating material being in the range of 3 to 10% by weight of the aqueous dispersion and the amount of said dispersion applied being in the range of 0.3 to 1 g/m² on the basis of the coating material; (b) drying the coated sheet, and (c) subjecting the coated sheet to a transverse stretching operation, said steps (a) and (b) being carried out at the latest before the transverse stretching operation (c).

2. A process for producing synthetic paper as claimed in claim 1 in which said resin used to produce the opaque paperlike layer is an α-olefin polymer resin.

3. A process for producing the synthetic paper as claimed in claim 2 in which said α-olefin polymer resin is selected from the group consisting of homopolymers of ethylene, homopolymers of propylene, and resinous copolymers consisting essentially of ethylene and propylene.

4. A process for producing the synthetic paper as claimed in claim 1 in which said aqueous dispersion is an aqueous emulsion.

5. A process for producing the synthetic paper as claimed in claim 1 in which said aqueous dispersion is an aqueous solution.

6. A process for producing the synthetic paper as claimed in claim 1 in which said dry-extensible, polymeric material is selected from ethylene vinyl acetate copolymers.

7. A process for producing the synthetic paper as claimed in claim 1 in which said dry-extensible, polymeric coating material is selected from polyethylene waxes.

8. A process according to claim 1 wherein the opaque synthetic sheet is produced by extruding a resin containing filler particles therein onto a resinous substrate which substrate has been previously longitudinally stretched and then treating the laminate according to the process steps (a), (b) and (c).

9. A process according to claim 1 wherein the dry-extensible polymeric coating is a $C_1$-$C_8$ alkyl acrylate homopolymer.

10. A process according to claim 1 wherein the dry-extensible polymeric coating is a $C_1$-$C_8$ alkyl acrylate copolymer.

* * * * *